(12) United States Patent
Terada

(10) Patent No.: US 8,300,852 B2
(45) Date of Patent: Oct. 30, 2012

(54) PARAMETER SETTING APPARATUS AND METHOD FOR AUDIO MIXER

(75) Inventor: Kotaro Terada, Hamamatsu (JP)

(73) Assignee: Yamaha Corporation, Hamamatsu-Shi, Shizuoka-Ken (JP)

( * ) Notice: Subject to any disclaimer, the term of this patent is extended or adjusted under 35 U.S.C. 154(b) by 1466 days.

(21) Appl. No.: 11/370,385

(22) Filed: Mar. 2, 2006

(65) Prior Publication Data

US 2006/0232586 A1    Oct. 19, 2006

(30) Foreign Application Priority Data

Mar. 14, 2005   (JP) .................................. 2005-070769

(51) Int. Cl.
*H04B 1/00*   (2006.01)
(52) U.S. Cl. .......................................... 381/119; 700/94
(58) Field of Classification Search .................. 381/119, 381/17, 18, 61, 307, 1, 123, 110, 104, 106, 381/107; 700/94
See application file for complete search history.

(56) References Cited

U.S. PATENT DOCUMENTS

| | | | | |
|---|---|---|---|---|
| 5,524,060 | A * | 6/1996 | Silfvast et al. | 381/104 |
| 7,366,307 | B2 * | 4/2008 | Yanz et al. | 381/60 |
| 7,366,313 | B2 * | 4/2008 | Kato | 381/119 |
| 2003/0059066 | A1 * | 3/2003 | Kohyama et al. | 381/119 |
| 2003/0091204 | A1 * | 5/2003 | Gibson | 381/119 |

OTHER PUBLICATIONS

Digital Mixing Console, PM5D/PM5D-RH Owner's Manual, Yamaha Corporation, Japan, pp. 110-112.

* cited by examiner

*Primary Examiner* — Davetta W Goins
*Assistant Examiner* — Lao Lun-See
(74) *Attorney, Agent, or Firm* — Morrison & Foerster LLP

(57) ABSTRACT

An array of parameter setting images corresponding to a plurality of parameters, and a plurality of tab images for selecting any one of a plurality of groups formed by grouping the plurality of parameters. The tab images are displayed on a screen in an arrangement associated with the array of the parameter setting images corresponding to the parameters belonging to corresponding ones of the groups. The grouping of the parameters is made such that a portion of the parameters included in a given one of the groups is shared with another of the groups, and a portion of the tab image corresponding to the portion of the parameters shared with the other group is displayed in a display style to indicate the sharing. Upon selecting a tab image, the parameters corresponding to the selected tab image are allocated to individual ones of the plurality of operators.

16 Claims, 6 Drawing Sheets

PARAMETER SETTING APPARATUS AND METHOD FOR AUDIO MIXER

BACKGROUND OF THE INVENTION

The present invention relates generally to parameter setting apparatus and methods for audio mixers, and more particularly to an improved display of a parameter setting screen on a display device.

Digital audio mixers have been known which convert an analog audio signal, input for each of a plurality of input channels, to a digital signal and they perform processing on the individual digital signals. Users of these digital audio mixers can each manually perform various operation related to mixing processing, using various operators provided on an operation panel (or mixing console), and a digital signal processing device (DSP) in the digital audio mixer performs mixing processing on input digital audio signals on the basis of the user operation. Further, in a particular type of digital audio mixer provided with a display, such as an LCD, provided on the operation panel, it is possible to make settings for the entire system, settings for each of various functions, etc., using a graphical user interface (GUI) on the display. Among examples of such a particular type of digital audio mixer is a digital audio mixer commercially available from the assignee of the instant application under a product name "PM5D". The digital audio mixer "PM5D" is introduced in a website "http://www2.yamaha.co.jp/manual/pdf/pa/english/mixers/PM5DE1.pdf".

In the conventionally-known digital audio mixer introduced or disclosed in the website, the user can read out a window of a graphic equalizer function (hereinafter also referred to as "graphic EQ parameter screen") onto the display and perform graphic EQ operation via the graphic EQ parameter screen. On the graphic EQ parameter screen, images of faders (i.e., fader images) are provided in corresponding relation to a plurality of frequency bands handled by the graphic EQ (a total of 31 (thirty one) frequency bands are handled in the audio mixer disclosed in the website), and the fader images corresponding to all of the frequency bands handled by the graphic EQ are displayed together in parallel on the single screen. The user can operate any of the fader images on the displayed screen to increase or decrease a level (sound volume) of the frequency band corresponding to the operated fader image. Desired eight of the plurality of frequency bands can be assigned to eight physical faders provided on the operation of the audio mixer, so that the user can perform manual operation on the bands thus assigned to the physical faders.

More specifically, the frequency bands are assigned to the physical faders in the following manner. Namely, the plurality of frequency bands are divided into a plurality of (e.g., six) groups, eight frequency bands per group, and images of switches for selecting a desired one of the groups (i.e., switch images for assigning the frequency bands to the physical faders). More specifically, the user can operate the switch image corresponding to a desired one of the groups and thereby assign the eight frequency bands, belonging to the desired group, to the eight physical faders. The fader images of the eight frequency bands, belonging to the group corresponding to the operated switch image, are each changed into a different display color from the other fader images, by which it can be indicated that these eight frequency bands are currently assigned to the physical faders.

Further, the eight frequency bands belonging to each of the groups are a set of eight consecutive frequency bands. Combining these consecutive frequency bands into each of the groups can contribute to an enhanced convenience for the user in operating the EQ. Further, the grouping is made such that, for every two groups whose respective ranges of the frequency bands adjoin each other, respective adjoining portions of the frequency bands, belonging to the two groups, overlap each other.

However, with the graphic EQ parameter screen of the conventionally-known audio mixer, it tends to be difficult to recognize correspondency between the groups and the frequency band ranges belonging to the groups. Therefore, the user of the audio mixer would often suffer from poor visibility, for example, as to which of the groups corresponds to which of ranges of the displayed fader images and as to correspondency between the frequency band range currently assigned to the physical faders and the fader images.

SUMMARY OF THE INVENTION

In view of the foregoing, it is an object of the present invention to provide an improved parameter setting apparatus and method for an audio mixer which, for parameters divided into groups in predetermined combinations, allow correspondency between the groups and the parameters belonging thereto to be readily visually recognized or grasped on a display screen.

In order to accomplish the above-mentioned object, the present invention provides an improved parameter setting apparatus for an audio mixer, which comprises: a plurality of operators each operable to set a value of a parameter allocated thereto; a display; and a control section that causes the display to display an array of parameter setting images, provided in corresponding relation to a plurality of parameters, to indicate respective settings of the parameters and also display a plurality of tab images for selecting any one of a plurality of groups formed by grouping the plurality of parameters, the plurality of tab images corresponding to the plurality of groups and being displayed in an arrangement associated with the array of the parameter setting images corresponding to the parameters belonging to the corresponding groups, wherein the grouping of the parameters is made in such a manner that a portion of the parameters included in a given one of the groups is shared with another of the groups, and a portion of the tab image corresponding to the portion of the parameters shared with the other group is displayed in a display style capable of indicating that the portion of the parameters is shared. The parameter setting apparatus further comprises a selection section that selects any one of the tab images, and an allocation section that allocates, to the individual operators, the parameters included in the group corresponding to the tab image selected via the selection section.

Such arrangements allow a user to readily visually recognize or grasp, on a screen of the display, correspondency between the tab images corresponding to the groups and the parameter setting images belonging to the groups. Further, the user can readily recognize which of the parameters is shared between different groups. Also, because the parameter shared between the different groups is allocated to any of the operators irrespective of which of the groups is currently selected, the parameter setting apparatus can be used with ease. As an example, each of the parameter setting images is a virtual operator image, and a value of the parameter corresponding thereto is settable by operation of the virtual operator image. For example, the tab image of each of the groups is displayed with a width associated with the array of the parameter setting images belonging to the group.

As an example, the display style of the tab image selected by the user and the parameter setting images belonging to the group corresponding to the selected tab image may be differentiated from the display style of the other tab images and other parameter setting images. For example, the differentiation of the display style may be made by differentiating a display color. Such arrangements can visually clarify correspondency between the selected group and the parameters belonging to the group. Further, on the screen of the display, there may be displayed virtual knob-type operator images that correspond in number to the parameters belonging to one of the groups, and the parameters belonging to the group corresponding to the selected tab image may be allocated to the virtual knob-type operator images. Such arrangements also permit parameter manipulation using the knob-type operator images. Because the knob-type operator images, corresponding in number to one group of the parameters, are displayed, the number of items to be displayed can be minimized, and thus, the knob-type operator images can each be displayed in a relatively large size. As a consequence, the knob-type operator images can be easily operated on the screen.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
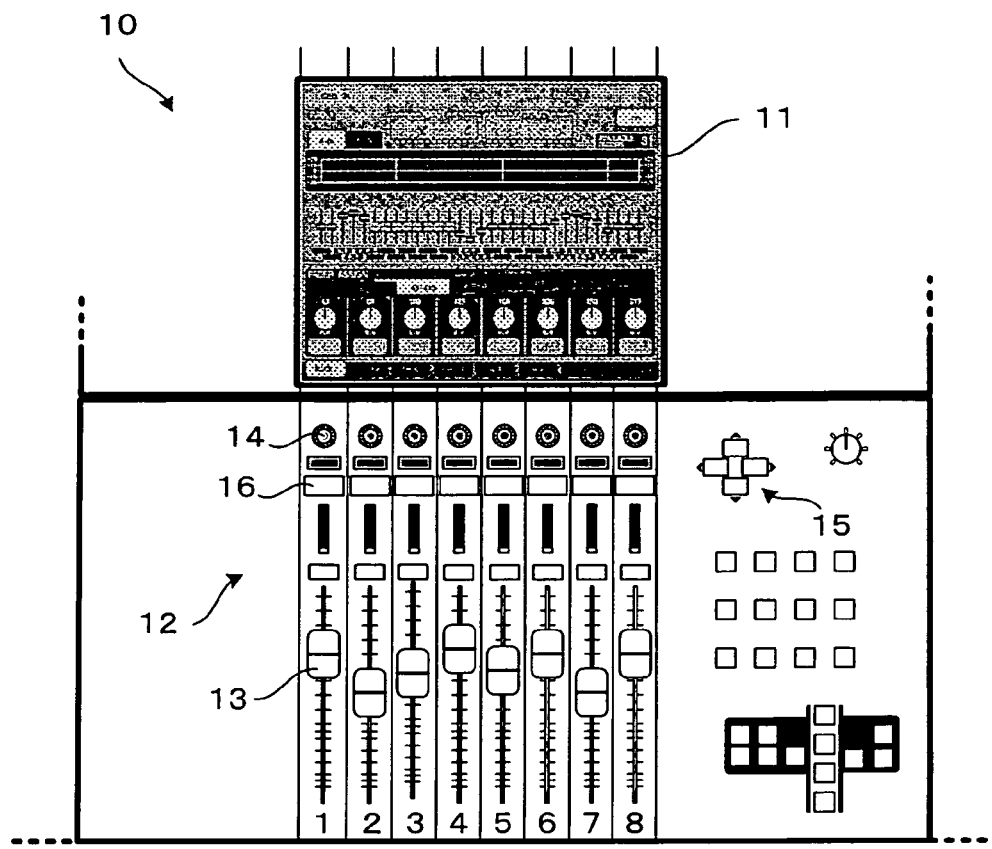
FIG. 1 is a view showing an outer appearance of an example of an operation panel (mixing console) of a digital audio mixer in accordance with an embodiment of the present invention, which particular shows only elements relevant to the features of the present invention.

FIG. 1 is a view showing an outer appearance of a mixing console (operation panel) of a digital audio mixer in accordance with an embodiment of the present invention. In FIG. 1, a display 11 is provided on the mixing console. The display 11 comprises, for example, an LCD, on which are displayed display screens (windows) corresponding to various functions of the audio mixer. These windows are each used as a user interface for, for example, making settings for the entire mixer system and parameters for each of the various functions. On the mixing console 10, there are also provided a multiplicity of operators (operator group) 12, such as physical faders, physical knob operators and cursor keys. Namely, a human operator or user of the audio mixer can instruct contents of mixing processing to be carried out, not only by operation of the operators 12 but also by use of the GUI elements (e.g., images of various virtual operator images, pointer, cursor, etc.). In the illustrated example of FIG. 1, the multiplicity of operators 12 include eight fader operators (physical faders) 13, eight knob operators (physical knobs) 14 and cursor keys 15. On the mixing console 10 of FIG. 1, there are provided eight channel strips; numerical values "1"-"8" indicated in a lower end region of the console 10 are respective numbers of the channel strips. One physical fader 13 and one physical knob 14 are provided for each of the channel strips. As later described in detail, parameters corresponding to the function of the window read out to the display 11 are allocated to the physical faders 13 and physical knobs 14, and each of the physical faders 13 and physical knobs 14 functions as an operator for setting the allocated parameter in response to manual operation thereof by the user. In the figure, reference characters are representatively given only to the leftmost ones of the physical faders 13 and physical knobs 14 which belong to channel strip "1", for convenience of illustration. Note that each of the channel strips may be provided with switches, level meter, numerical value displays, etc. in addition to the above-mentioned physical fader 13 and physical knob 14. FIG. 1 extractively shows only principal portions and elements of the mixing console 10 pertinent to the features of the instant embodiment. Although not specifically shown and described here, the mixing console 10 includes various other sections, such as a section for manipulating parameters of input channels and parameters of output channels.

Figure 2:
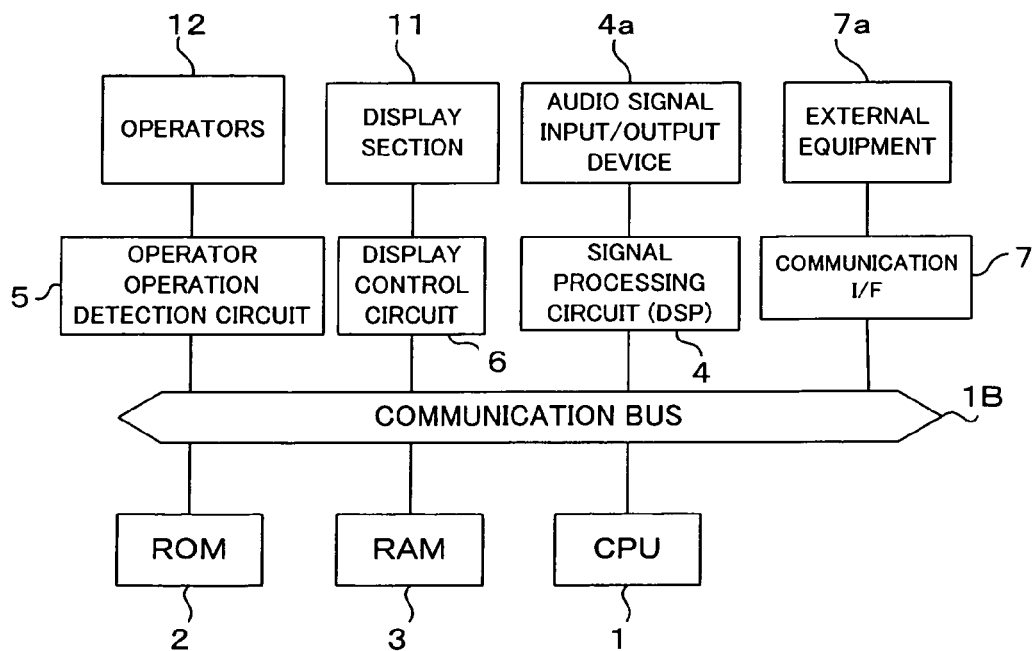
FIG. 2 is a block diagram showing an example electric hardware setup of the digital audio mixer of FIG. 1.

FIG. 2 is a block diagram showing an example of a general electric hardware setup of the embodiment of the audio mixer of FIG. 1. The audio mixer includes a CPU 1, a ROM 2, a RAM 3, a signal processing circuit (DSP) 4, an operator operation detection circuit 5, a display control circuit 6, and a communication interface (IF) 7. The above-mentioned components are connected with one another via a communication bus 1B, and an operation section 12 including the operators of FIG. 1 is connected, via the operator operation detection circuit 5, to the communication bus 1B. Further, the display 11 of FIG. 1 is connected to the communication bus 1B via a display control circuit 6.

The CPU 1 executes various control programs, stored in the ROM 2 or RAM 3, to control all operations of the audio mixer. Further, the CPU 1 performs control to display, on the display section (display) 11, display screens (windows) corresponding to various functions of the audio mixer, but also detects various operation on display section 11 and operation section 12. Through various operation using the operation section 12 and GUI of the display 11, the user performs mixing operation including tone volume control, setting of various effects, etc., instructs activation of various functions, and performs various other operations. The signal processing circuit (DSP) 4 performs signal processing (mixing processing) on digital audio signals input via an audio signal input/output device 4a, on the basis of contents of various operation detected by the CPU 1, and outputs the results of the processing to the audio signal input/output device 4a as mixed outputs.

Further, the audio mixer of the present invention may be connected to external equipment 7a, such as a personal computer, via the communication I/F 7, in which case data can be transmitted and received (i.e., communicated) between the audio mixer and the external equipment 7a. Through execution of mixer-controlling software programs, the external equipment 7a can control overall operation of the audio mixer and display operating states of the audio mixer on a display provided on the external equipment 7a.

As the various programs for execution by the CPU 1, there may be used not only programs stored in the ROM 2 and/or RAM 3, but also programs downloaded from server computers via the communication interface and stored in a not-shown hard disk device (HDD) or the like. Also, programs stored in an external storage medium, such as the not-shown hard disk device or CD-ROM, may be used. In this case, any of the various programs is transferred from the external storage medium to the RAM 3 when necessary and executed under control of the CPU 1. Such arrangements greatly facilitate version upgrade of the control program, addition of a new control program, etc.

Figure 3:
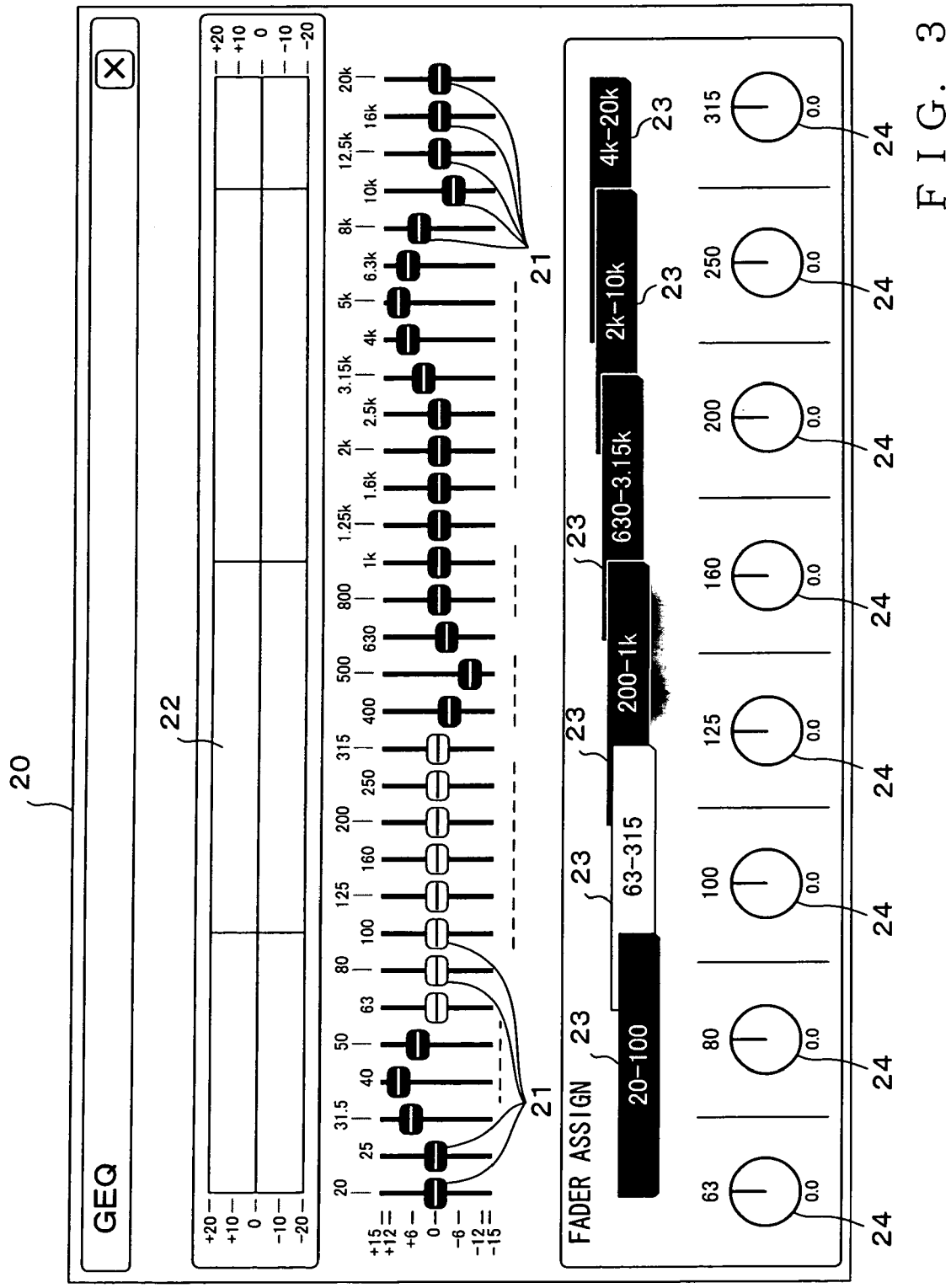
FIG. 3 is a diagram showing an example of a display screen of a graphic equalizer function displayed on a display in the digital audio mixer of FIG. 1.

FIG. 3 is an example of a graphic equalizer (graphic EQ) parameter screen 20 displayed on the display 11. With the graphic EQ function, the user can individually increase or decrease a plurality of frequency bands (in this case, 31 frequency bands in a range of 20 Hz to 20 kHz) handled by the graphic EQ. Let it be assumed that the graphic EQ parameter screen 20 is read out in response to an instruction for activating the graphic EQ function. Note that a string of letters "GEQ" in an upper end region of the screen 20 in FIG. 1 is an abbreviated notation of graphic equalizer (or graphic EQ).

On the graphic EQ parameter screen 20, there are displayed images of a plurality of fader operators (i.e., fader images) 21 in corresponding relation to the plurality of frequency bands handled by the graphic EQ. Numerical values indicated immediately above each of the fader images 21 represents the frequency band corresponding to the fader image 21. A total of 31 fader images 21, corresponding to the 31 frequency bands handled by the graphic EQ, are displayed together in parallel. These fader images 21 are arranged, from the left to the right of FIG. 3, in the order of increasing frequency band levels. Because the 31 fader images 21 are displayed together in a display area of a limited size, each of the fader images 21 has a relatively small size. Vertical operating positions of a virtual knob portion of each of the fader images 21 represent level (tone volume) positions of the corresponding frequency band. The user can vary the operating position of the virtual knob portion of any one of the fader images 21 within a variable range (±15 dB in the illustrated example), to thereby increase or decrease the level (tone volume) of the corresponding frequency band. In FIG. 3, numerical values (+15,+12, ..., 0, ..., −12, −15), indicated in a left-end region of the display area of the fader images 21, show correspondency between the operating positions of the virtual knob portion and the fader setting. Further, on an equalizer graph section 22, there is shown a graph of characteristics corresponding to current settings of the graphic EQ.

The graphic EQ can be operated either by using the virtual operators (fader images 21) displayed on the display 11, or by using the physical operators 12 (see FIG. 1) provided on the mixing console 10. In the case where the graphic EQ is operated by the physical operators 12 provided on the mixing console 10, the 31 frequency bands handled by the graphic EQ are divided or grouped into six groups each comprising eight of the frequency bands, and the eight frequency bands of each of the groups are extracted as objects of operation by the graphic EQ using the physical operators 12. Briefing now the grouping of the frequency bands in the instant embodiment, the groups in the embodiment are, in the order of increasing frequency levels, a group of "20 Hz-100 Hz", group of "63 Hz-315 Hz", group of "200 Hz-1 kHz", group of "630 Hz-3.15 kHz", group of "2 kHz-10 kHz" and group of "4 kHz-20 kHz". Each of the groups comprises a set or combination of eight consecutive frequency bands; the "20 Hz-100 Hz" group, for example, has eight consecutive frequency bands of 20 Hz, 25 Hz, 31.5 Hz, 40 Hz, 50 Hz, 63 Hz, 80 Hz and 100 Hz. The six groups based on such a grouping scheme can cover all of the frequency bands (20 Hz-20 kHz). Further, the grouping is made such that every two of the groups, whose respective ranges of the frequency bands adjoin each other, share a portion of the frequency bands constituting the two groups; for example, between the groups of "20 Hz-100 Hz" and "63 Hz-315 Hz", the frequency band of "3 Hz-100 Hz" is shared.

Images of six tabs (i.e., tab images) 23, which correspond to the six groups (i.e., to each of which is allocated one of the groups), are displayed on the graphic EQ parameter screen 20, in a manner as illustrated in FIG. 3. Each of the tab images 23 indicates the range of the frequency bands included in the corresponding group (i.e., group allocated to that tab image 23). These six tab images 23 are arranged horizontally in the left-to-right direction of the screen, in conformity to an array of the fader images 21 displayed above the tab images 23, in the order of increasing frequency band levels of the corresponding group and in parallel relation to the array of the fader images 23. Each of the tab images 23 has a horizontal (displayed or arranged) width substantially equal to an overall horizontal (displayed or arranged) width of the corresponding set of the fader images 21 (i.e., eight fader images 21 used for the frequency band range of the group corresponding to the tab image 23). Further, a displayed position (i.e., left-end and right-end positions), in the horizontal direction of the screen, of each of the six tab images 23 substantially agrees with (i.e., vertically aligns with) displayed positions of the leftmost and rightmost fader images 21 of the corresponding set of the fader images 21. Further, the overall horizontal (displayed) width (in a direction of an array of the frequency bands) of the set of the six tab images 23 substantially agrees with the overall horizontal (displayed) width of the array of the 31 fader images 21; that is, in the horizontal direction of the screen, the six tab images 23 is coextensive with the 31 fader images 21.

Further, in the instant embodiment, between every adjoining two of the groups, whose respective ranges of the frequency bands adjoin each other, a portion of the frequency bands constituting the two groups is shared. In order to visually indicate the sharing, between the two groups, of the portion of the frequency bands, portions of the two tab images 21 to be displayed in adjoining relation to each other, which correspond to the shared frequency band portion, (i.e., tab image portions corresponding to the displayed positions of the fader images 21 to be used for the shared frequency band portion) are displayed in mutually-overlapping relationship. Horizontal width of the tab image portions to be displayed in mutually-overlapping relationship are set to be substantially equal to an overall horizontal width of the set of the fader images 21 to be used for the shared frequency band portion, and leftmost and rightmost displayed positions of the shared frequency band portion are set to substantially agree with displayed positions of the leftmost and rightmost ones of the fader images 21 to be used for the shared frequency band portion. More specifically, as seen in FIG. 3, the leftmost tab image 23 corresponding to the 20 Hz-100 Hz group and the second tab image 23 from the left end, corresponding to the 63 Hz-315 Hz group, are displayed with their respective portions corresponding to the shared frequency band portion of 63 Hz-100 Hz displayed in mutually-overlapping relationship. With the above-described display scheme, the user can readily visually recognize correspondency among the groups corresponding to the tab images 23, the frequency band ranges belonging to the groups and the sets of the fader images 21 corresponding to the frequency band ranges belonging to the groups.

Each of the tab images 23 functions as a virtual operator (GUI) operable to select any one of the six groups as a group of frequency bands to be extracted as objects of operation using the physical operators 12. By the user designating, on the display 11, the tab image 23 corresponding to a desired one of the groups, the group corresponding to the designated tab 23 is selected. Then, the eight frequency bands included in the selected group are allocated to the operators 12 on the mixing console 10, such as the eight physical faders 13 and physical knobs 14 shown in FIG. 1, so that the user can manipulate settings of the frequency bands using the operators 12.

In the instant embodiment, the tab image 23 selected by the user and the fader images 21 corresponding to the selected tab image 23 are displayed on the screen in a display color different from that of the other tab images 23 and other fader images 21. In the illustrated example of FIG. 3, the selected tab image 23 (i.e., group of the frequency band range of 63 Hz-315 Hz) is displayed in white while the other tab images 23 are displayed in black, and the eight fader images 21 belonging to the group (i.e., group of the frequency band range of 63 Hz-315 Hz) corresponding to the selected tab image 23 are displayed in white while the other faders 21 are displayed in black. Because the display color of the tab image 23 selected by the user and the fader images 21 corresponding to the selected tab image 23 is differentiated from the display color of the other tab images 23 and other fader images 21 in this manner, the tab image 23 of the selected group and the fader images corresponding to the frequency band range of the selected group can be distinguished from the other tab images 23 and other fader images 21. As a result, visibility of the frequency band range corresponding to the selected group can be significantly enhanced.

The eight fader images 21 of the frequency band range belonging to the selected group are assigned to the eight physical faders 13 on the mixing console 10, one fader image 21 per physical fader 13. The user can use the physical faders 12 to manipulate settings of the frequency bands corresponding to the fader images 21. Let it be assumed that, on the mixing console 10, the frequency bands are sequentially allocated to the physical faders 13, starting with the leftmost physical fader 13, in the order of increasing frequency band levels.

Further, on the graphic EQ parameter screen 20, images of virtual knob operators (knob images) 24 function as virtual operators (GUI) for manipulating settings for the eight frequency bands belonging to the selected group. In the instant embodiment, eight knob images 24 are displayed on the EQ parameter screen 20 in correspondence with the number of, eight in this case, of the frequency bands belonging to each of the groups, and the eight frequency bands belonging to the selected group are assigned to the knob images 24, one frequency band per knob image 24. Let it be assumed that the frequency bands are sequentially allocated to the knob images 24, starting with the leftmost knob image 24 on the screen 20, in the order of frequency band levels. In a region immediately above each of the knob images 24, there is indicated a numerical value indicative of a current setting of the frequency band assigned thereto. The knob images 24 are assigned to the eight physical knobs 14 on the mixing console 10, one knob image 24 per physical knob 14. The user can also use these physical knobs 14 to manipulate the settings of the frequency bands allocated to the knob images 24. Let it be assumed that, on the mixing console 10, the frequency bands are sequentially allocated to the physical knobs 14, starting with the leftmost physical knob 14, in the order of increasing frequency band levels.

Only the number of the knob images 24 corresponding to the number of (i.e. eight in this case) frequency bands belonging the selected group have to be displayed on the graphic EQ parameter screen 20. Thus, the display area of the screen can be used efficiently, and the displayed size of each of the knob images 24 can be made relatively large. In the above-discussed conventionally-known technique, where the fader images of all of the frequency bands are displayed together in parallel on the graphic EQ parameter screen, would present the inconvenience that each of the fader images is displayed in a relatively small size and thus tends be difficult to operate on the screen. To avoid the inconvenience encountered by the conventionally-known technique, the instant embodiment of the present invention is arranged to use the knob images 24 that can each be displayed in a relatively great size in the aforementioned manner; as a consequence, the instant embodiment can advantageously enhance operability in adjusting the levels of the individual frequency bands on the display 11.

Figure 4:
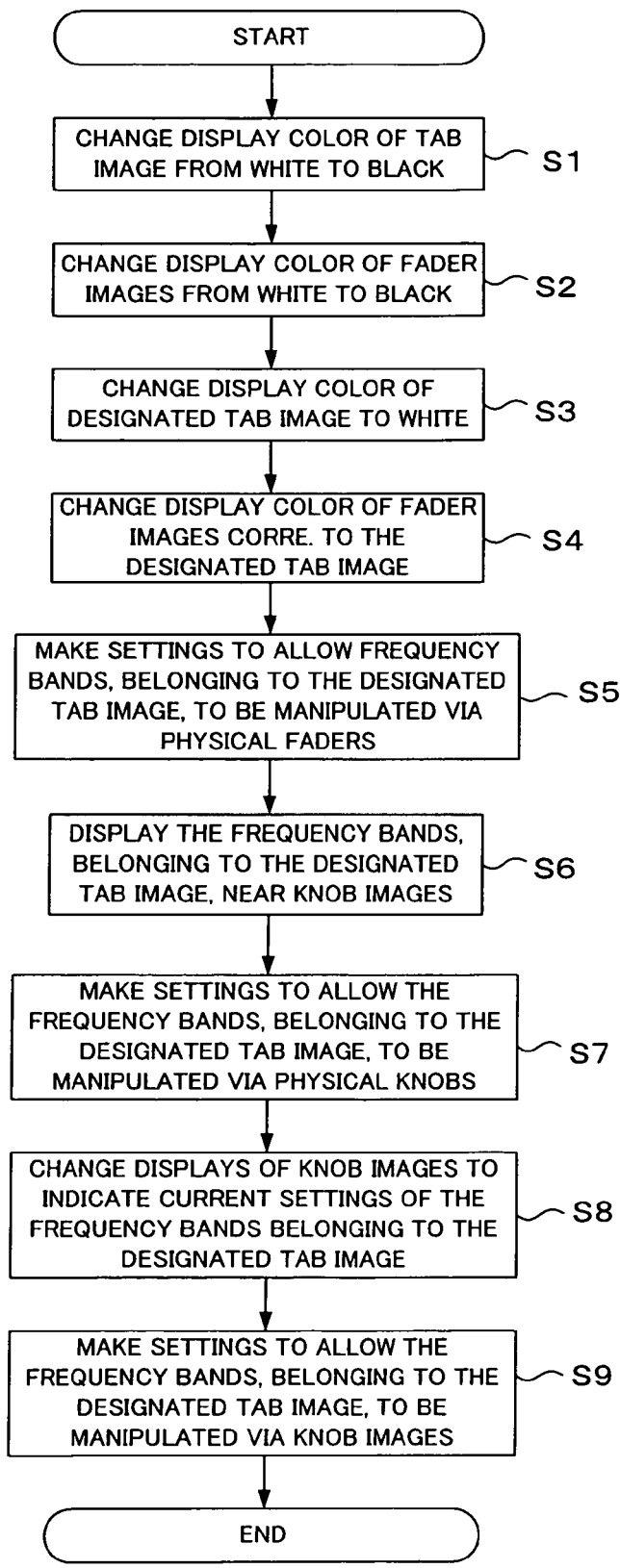
FIG. 4 is a flow chart showing an example operational sequence for processing operation of any one of tab images displayed on the display screen in the embodiment.

Next, a description will be given about behavior of the graphic EQ function in the instant embodiment. Once the graphic EQ function is instructed by the user, the graphic EQ parameter screen 20 is opened on the display 11 as shown in FIG. 3. On the graphic EQ parameter screen 20 thus opened, the last-selected tab image 23 and the fader images 21 belonging to the group corresponding to the last-selected tab image 23 are displayed in white. Then, once operation for newly designating any one of the tab images 23 has been performed on the graphic EQ parameter screen 20, tab image operation processing is started up. FIG. 4 is a flow chart showing an example operational sequence of the tab image operation processing. Any desired one of the tab images 23 may be designated by operating the pointer or cursor on the screen 20 using any of the operators (such as the cursor keys 15 of FIG. 1) provided on the console 10, or by operating any one of tab image designating switches. In the latter case, a plurality of switches (e.g., switches 16 of FIG. 1) on the mixing console 10 may be used as the tab image designating switches; namely, the tab images 23 may be assigned to the six switches 16 so that the user can operate the switch 16 corresponding to a desired one of the tab images 23.

Once it is detected that any one of the tab images 23 has been selected on the graphic EQ parameter screen 20, the display color of the last-selected tab image 23 is changed from white to black (step S1 of FIG. 4), and the display color of the fader images 21 of the group corresponding to that tab image 23 is also changed from white to black (step S2). Further, the display color of the newly-designated tab image 23 is changed from black to white (step S3), and the display color of the fader images 21 of the group corresponding to the newly-designated tab image 23 is also changed from black to white (step S4). In this manner, the display color of the user-designated tab image 23 and fader images 21 corresponding to that tab image 23 is differentiated from the display color of the other tab images 23 and other fader images 21, to allow the user to visually distinguish between the designated tab image 23 and corresponding fader images 21 and the other, or non-designated, tab images 23 and fader images 21. Then, the processing proceeds to steps S5-S9 in order to carry out a process for making such settings as to allow the (eight) frequency bands, belonging to the group corresponding to the designated tab image 23, to be manipulated via the eight physical faders 13 on the mixing console 10 (step S5), a process for displaying the respective levels of the frequency bands near, e.g. immediately above, the corresponding knob images on the graphic EQ parameter screen (see FIG. 3) (step S6), a process for making such settings as to allow frequency bands, belonging to the designated tab image 23, to be manipulated via physical knobs (step S7), a process for changing the displays of the knob images 24 on the basis of the current settings of the individual frequency bands (step S8) and a process for making such settings as to allow the frequency bands to be manipulated via the corresponding knob images 24 (step S9). In the aforementioned manner, the frequency bands belonging to the group corresponding to the user-designated tab image 23 are allocated to the physical faders 13, physical knobs 14 and knob images 24. Note that the aforementioned operational sequence is just illustrative and details of the operations at steps S1-S9 are not limited to those illustrated in FIG. 4.

Figure 5A:
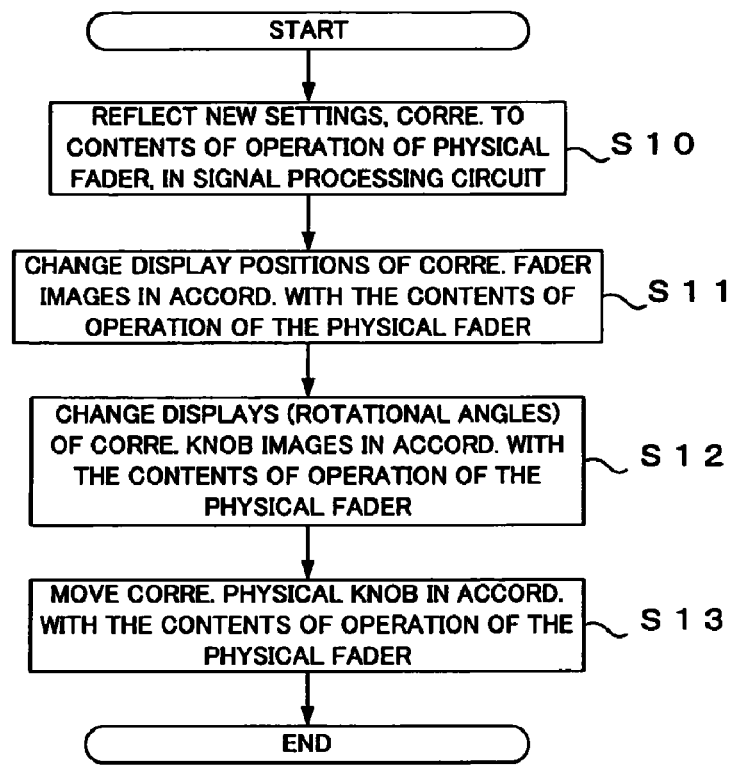
FIG. 5A is a flow chart showing an example operational sequence for processing operation of any one of physical faders displayed on the display screen in the embodiment.
Figure 5B:
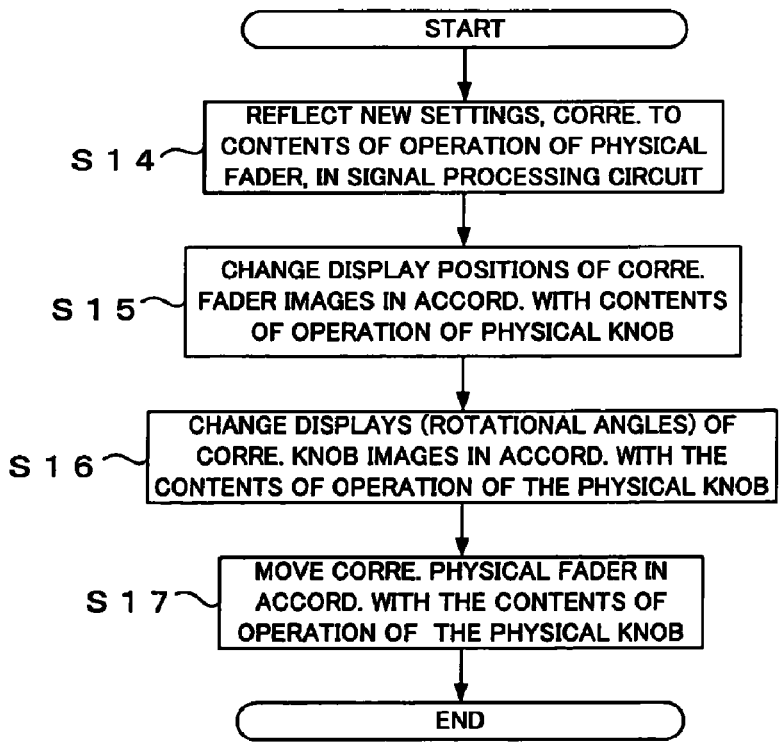
FIG. 5B is a flow chart showing an example operational sequence for processing operation of any one of physical knobs displayed on the display screen.

With reference FIGS. 5A and 5B, a description will now be given about processing responsive to operation of any one of the physical faders 13 or physical knobs 14 on the mixing console 10. Once any one of the physical faders 13 or physical knobs 14 is operated while the graphic EQ parameter screen 20 is being displayed on the display 11, the processing of FIG. 5A or 5B is started up. The processing responsive to operation of any one of the physical faders 13 is carried out at steps S10-S13 shown in FIG. 5A. Namely, for the frequency band allocated to the operated physical fader 13, new settings corresponding to the operation of the physical fader 13 are reflected in the signal processing circuit 4 (see FIG. 2) at step S14, the displayed operating position of the fader image 21, corresponding to the frequency band allocated to the operated physical fader 12 and the displays (i.e., displayed rotational angles and numerical values indicative of the current setting displayed immediately below the knob image 24) of the knob image 24 corresponding to the frequency band are changed on the basis of the contents of the operation of the physical fader 13, and the rotational position of the physical knob 14 corresponding to the frequency band is moved on the basis of the contents of the operation of the physical fader 13. As seen from steps S11-S13, the displayed contents of the corresponding fader image 21 and knob image 24 and the operating position of the corresponding physical knob 14 are varied in interlocked relation to the operation of the physical fader 13.

The processing responsive to operation of any one of the physical knobs 14 is carried out at steps S14-S17 shown in FIG. 5B. Namely, for the frequency band allocated to the operated physical knob 14, new settings corresponding to the operation of the physical knob 14 are reflected in the signal processing circuit 4 (see FIG. 2) at step S14, the displayed contents of the fader image 21 and knob image 24, corresponding to the frequency band allocated to the operated physical knob 14, are changed on the basis of the contents of the operation of the physical knob 14, and the operating position of the physical fader 13 corresponding to the frequency band is moved on the basis of the contents of the operation of the physical knob 14. In this case, the operation of the physical knob 14 is reflected in the displayed contents of the corresponding fader image 21 and knob image 24 and the operating position of the corresponding physical knob 14, in generally the same manner as described above.

Figure 6:
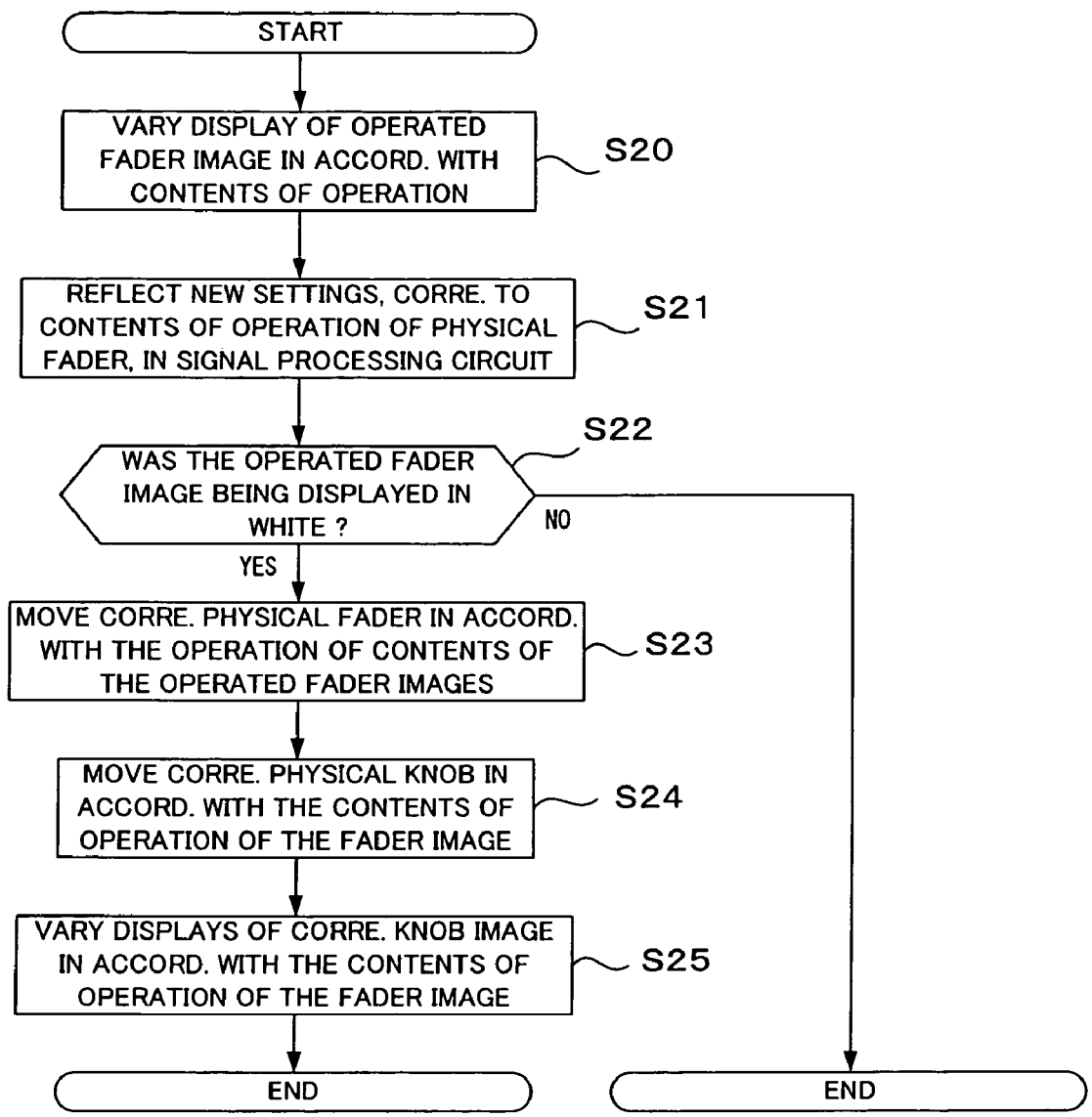
FIG. 6 is a flow chart showing an example operational sequence for processing operation of any one of fader images displayed on the display screens in the embodiment.

Of course, on the graphic EQ parameter screen 20, the user can operate settings of the frequency band can operate any one of the fader images 21 to vary the settings of the frequency band corresponding to the operated fader image 21. FIG. 6 is a flow chart showing an example operational sequence of processing responsive to operation of any one of the fader images 21. The processing of FIG. 6 is started up in response to operation of any one of the 31 fader images 21 on the screen 20. Any one of the fader images 21 may be operated by operating a given one of the operators (such as the cursor keys 15 of FIG. 1), provided on the console 10, to manipulate the pointer or cursor. The display of the operated fader image 21 is varied in accordance with the contents of the operation, at step S20. Then, for the frequency band corresponding to the operated fader image 21, new settings corresponding to the operation of the fader image 13 are reflected in the signal processing circuit 4 (see FIG. 2), at step S21. The operations at steps S20 and S21 are carried out in the aforementioned manner no matter of which of the fader images 21 has been operated. If the operated fader image 21 was being displayed in black (NO determination at step S22), it means that the operated fader image 21 does not belong to the currently-selected group, the instant processing is brought to an end. If, on the other hand, the operated fader image 21 was being displayed in white (YES determination at step S22), it means that the operated fader image 21 belongs to the currently-selected group, and thus, processes are carried out for reflecting the operation of the fader image 21 in other corresponding operators (i.e., physical fader 13, physical knob 14 and knob image 24). Namely, a process is carried out, at step S23, for moving the operational position of the physical fader 13, corresponding to the operated fader image 21, on the basis of the contents of the operation of the fader image 21, a process is carried out, at step S24, for moving the operational position (i.e., rotational angle) of the physical knob 14, corresponding to the operated fader image 21, on the basis of the contents of the operation of the fader image 21, and a process is carried out, at step S25, for varying the displays (i.e., displayed rotational angle and numerical value indicative of the current fader setting) of the knob image 24 on the basis of the contents of the operation of the fader image 21. The order in which the processes of steps S23-S25 are carried out is not limited to that shown in FIG. 6 and may be varied as necessary.

Figure 7:
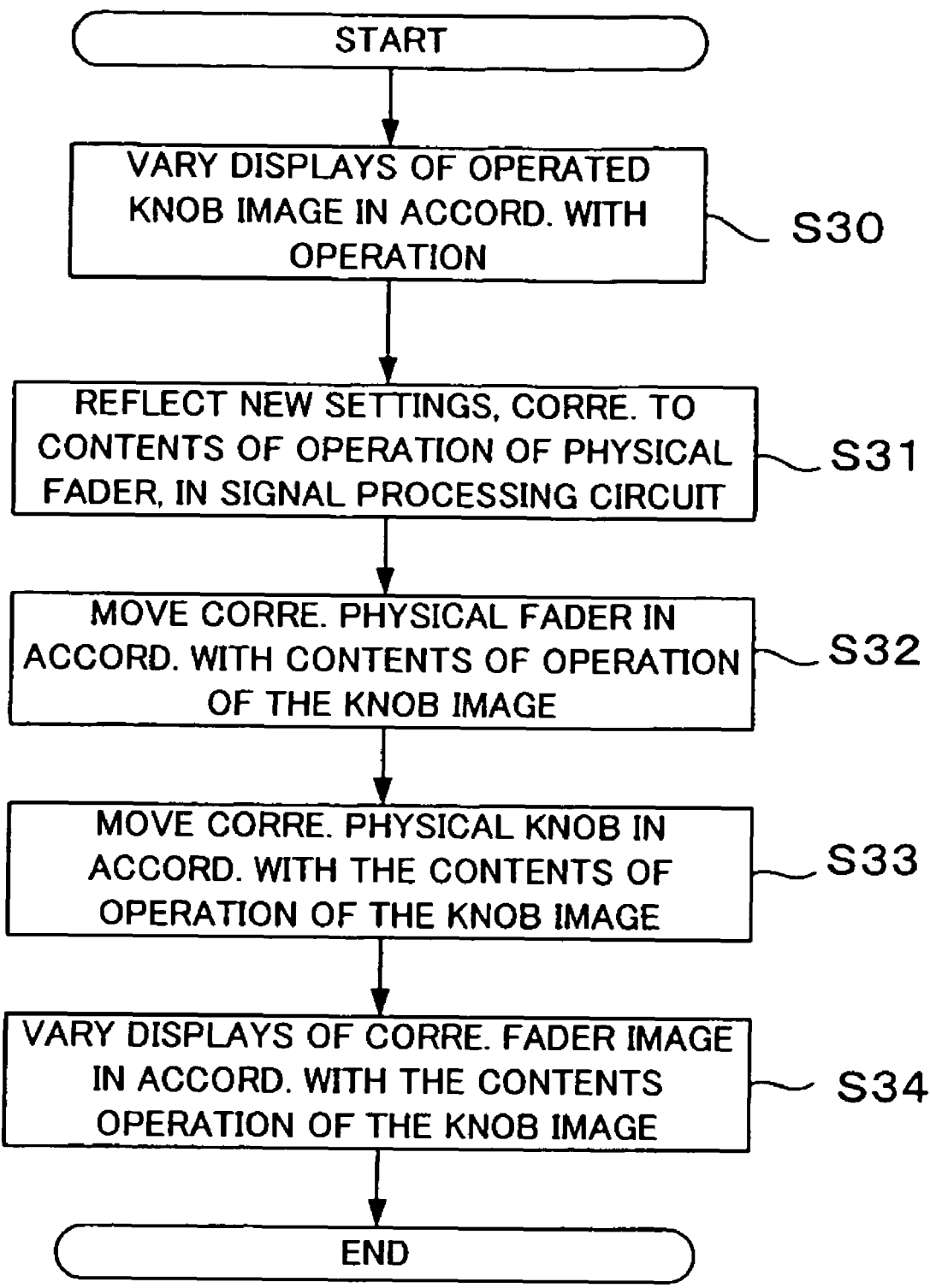
FIG. 7 is a flow chart showing an example operational sequence for processing operation of any one of knob images displayed on the display screen in the embodiment.

FIG. 7 is a flow chart showing an example operational sequence of processing responsive to operation of any one of the knob images 24 on the graphic EQ parameter screen 20. The processing of FIG. 7 is started up in response to operation of any one of the knob images 24 on the screen 20, so that processes of steps S30-S34 are carried out. Namely, the displays (i.e., displayed rotational angle and numerical value indicative of the current setting) of the operated knob image 24 are varied, at step S30, on the basis of the contents of the operation of the knob image 24, and, for the frequency band allocated to the operated knob image 24, new settings corresponding to the contents of the operation of the knob image 24 are reflected in the signal processing circuit 4 (see FIG. 2). Then, the process is carried out, at step S32, for moving the operational position of the physical fader 13 corresponding to the operated knob image 24 on the basis of the contents of the operation of the knob image 24, the process is carried out, at step S33, for moving the operational position (i.e., rotational angle) of the physical knob 14 corresponding to the operated knob image 24 on the basis of the contents of the operation, and the displayed position of the fader image 21, corresponding to the operated knob image 24, is varied on the basis of the contents of the operation.

According to the instant embodiment of the digital audio mixer, as having been set forth above, the graphic EQ function, handling the plurality of frequency bands, operates in such a manner that the tab images 23, operable to select a desired one of the plurality of groups of the frequency bands, are displayed in correspondence with the arrangement or array of the fader images 21 corresponding to the frequency bands constituting the individual groups; that is, the tab images 23 are each displayed with the displayed width thereof conformed to the arrangement or array width of the fader images corresponding to that tab image. If adjoining ones of the groups share a portion of the constituent frequency bands, the two tab images 23 corresponding to the two adjoining groups are displayed with their respective portions, corresponding to the shared portion of the frequency bands, overlapping each other. As a result, the instant embodiment can achieve the superior benefit that the user can readily visually recognize correspondency between the group corresponding to any one of the tab images 23 and the frequency band range belonging to the group.

Further, the above-described embodiment is characterized in that the display color of the tab image corresponding to the currently-selected group and fader images belonging to the currently-selected group is differentiated from the display color of the other tab images and other fader images. In this way, the currently-selected group and the other groups can be clearly visually distinguished from each other, so that the described embodiment can significantly enhance the visibility of the frequency band range corresponding to the selected group.

Furthermore, because level adjustment of the frequency bands belonging to the currently-selected group can be made using the knob images 24, the described embodiment can advantageously greatly facilitate the level adjustment of the frequency bands on the display 11.

Whereas the embodiment has been described above in relation to the case where tab image portions, corresponding to a frequency band portion shared between two groups corresponding to two tab images 23 (i.e., shared frequency band portion), are displayed in mutually-overlapping relationship, the tab image portions may be displayed in any other suitable manner where the image portions do not overlap each other in a direction substantially perpendicular to the screen, as long as the display can visually indicate that a frequency band portion is shared between two adjoining groups. For example, in an alternative display scheme, the two tab images 23 may be displaced from each other in the vertical direction of the screen in such a manner that the two tab image portions, corresponding to the shared frequency band portion, are not indicated as overlapping each other in the direction substantially perpendicular to the screen but they are indicated in parallel as overlapping each other along their horizontal edges over a horizontal length corresponding to a specific number of parameters shared between the corresponding groups; namely, the two tab images 23 may be displayed as displaced from each other in a stepwise fashion without overlapping each other in the direction substantially perpendicular to the screen. Such an alternative display scheme too can visually indicate that a particular frequency band portion is shared between two adjoining groups.

Furthermore, whereas the embodiment has been described above in relation to the case where, as illustrated in FIG. 3, the display color of the tab image 23 corresponding to the user-selected group and fader images 21 corresponding to that tab image is "white" while the display color of the other tab images and other fader images is "black", the present invention is not so limited, and other display colors may be chosen as long as different colors are allocated to the tab image and fader images corresponding to the user-selected group and to the other tab images and other fader images to permit visual distinction therebetween. For example, other suitable different display styles than the different display colors may be applied to the tab image and fader images corresponding to the user-selected group and to the other tab images and other fader images for visual distinction therebetween; as an example, the tab image and fader images corresponding to the user-selected group may be displayed in a blinking fashion.

Furthermore, whereas the graphic EQ in the embodiment has been described above as handling a total of 31 frequency bands, the number of the frequency bands to be handled by the EQ is not limited to 31. Furthermore, although the embodiment has been described above as dividing the frequency bands into groups each comprising eight frequency bands, the frequency bands may be grouped in any other suitable manner with each of the groups comprising any other number of the frequency bands. Further, the number of the groups is not limited to six. Furthermore, the respective numbers of the various operators (physical and virtual operators) are not limited to those mentioned in connection with the above-described embodiment.

Furthermore, whereas the embodiment has been described above in relation to the case where the basic principles of the present invention are applied to the graphic EQ parameter setting screen, the present invention may be applied to any other constructions than those of equalizers, as long as images corresponding to a plurality of parameters and images corresponding to groups comprising predetermined combinations of the plurality of parameters are displayed in a given arrangement or layout on a single screen.

What is claimed is:

1. A parameter setting apparatus for an audio mixer comprising:

a plurality of operators each operable to set a value of an audio mixer parameter allocated thereto;

a display;

a control section that causes said display to display an array of parameter setting images, provided in corresponding relation to a plurality of parameters, to indicate respective settings of the parameters and also display a plurality of tab images for selecting any one of a plurality of groups formed by grouping the plurality of parameters, the plurality of tab images corresponding to the plurality of groups and being displayed in an arrangement associated with the array of the parameter setting images corresponding to the parameters belonging to corresponding ones of the groups, wherein the grouping of the parameters is made in such a manner that a portion of the parameters included in a given one of the groups is shared with another of the groups, and a portion of the tab image corresponding to the portion of the parameters shared with the other group is displayed in a display style capable of indicating that the portion of the parameters is shared;

a selection section that selects any one of the tab images; and an allocation section that allocates, to individual ones of said plurality of operators, the parameters included in the group corresponding to the tab image selected via said selection section, so that each one of the parameters allocated to the individual ones of said plurality of operators is adjustable in response to operation of a corresponding one of the operators;

wherein said control section indicates that the portion of the parameters is shared between the groups corresponding to two adjoining tab images, by displaying respective portions of the two adjoining tab images, corresponding to the shared portion of the parameters, in at least partly overlapping relation to each other;

wherein the plurality of the parameters correspond to a plurality of frequency bands of an equalizer;

wherein the parameters are grouped in such a manner that, between every two of the groups whose frequency bands adjoin each other, portions of the frequency bands belonging to the adjoining groups overlap each other and within each group, all of the parameters within each group, including parameters that overlap between adjoining groups, are adjustable to set values of the audio mixer; and wherein the plurality of operators and adjustable parameters included in each one of the groups are identical in number to each other.

2. A parameter setting apparatus as claimed in claim 1 wherein each of the parameter setting images is a virtual operator image, and a value of the parameter corresponding thereto is settable by operation of the virtual operator image.

3. A parameter setting apparatus as claimed in claim 1 wherein the tab image of each of the groups is displayed with a width associated with the array of the parameter setting images belonging to the group.

4. A parameter setting apparatus as claimed in claim 1 wherein said control section performs control to differentiate a display style of the tab image selected via said selection section and the parameter setting images belonging to the group corresponding to the selected tab image, from a display style of other said tab image and other said parameter setting images.

5. A parameter setting apparatus as claimed in claim 4 wherein differentiation of the display style is made by differentiating a display color.

6. A parameter setting apparatus as claimed in claim 1 wherein said control section indicates that the portion of the parameters is shared between the groups corresponding to adjoining two of the tab images, by displaying respective portions of the adjoining two tab images, corresponding to the shared portion of the parameters, in parallel relation to each other.

7. A parameter setting apparatus as claimed in claim 1 wherein individual ones of the parameter setting images corresponding to the parameters included in the group corresponding to the selected tab image and individual ones of said operators, to which the parameters included in the group corresponding to the selected tab image are allocated, are set to interlock with each other, so that operating any one of either the parameter setting images or the operators can set a value of the parameter corresponding to the operated one parameter setting image or operator.

8. A parameter setting apparatus as claimed in claim 7 wherein a value of each of the parameters corresponding to the parameter setting images that do not correspond to the selected tab image can be set by operation of the corresponding parameter setting image.

9. A parameter setting apparatus as claimed in claim 2 wherein the virtual operator images are images representative of operators that are identical in type to said operators.

10. A parameter setting apparatus as claimed in claim 1 wherein said control section further displays, on a screen of said display, other parameter setting images corresponding in number to the parameters included in one of the groups, and said allocation section further allocates, to said other parameter setting images, the parameters included in the group corresponding to the selected tab image.

11. A parameter setting apparatus as claimed in claim 10 wherein said other parameter setting images are virtual knob-type operator images.

12. The parameter setting apparatus as recited in claim 1, wherein the plurality of parameters set via the plurality of operators comprise sound volume levels corresponding to individual ones of the plurality of frequency bands of the equalizer.

13. A parameter setting method for an audio mixer, the audio mixer including a plurality of operators each operable to set a value of an audio mixer parameter allocated thereto, and a display, said parameter setting method comprising:

a step of causing said display to display an array of parameter setting images, provided in corresponding relation to a plurality of parameters, to indicate respective settings of the parameters and also display a plurality of tab images for selecting any one of a plurality of groups formed by grouping the plurality of parameters, the plurality of tab images corresponding to the plurality of groups and being displayed in an arrangement associated with the array of the parameter setting images corresponding to the parameters belonging to corresponding ones of the groups, wherein the grouping of the parameters is made in such a manner that a portion of the parameters included in a given one of the groups is shared with another of the groups, and a portion of the tab image corresponding to the portion of the parameters shared with the other group are displayed in a style capable of indicating that the portion of the parameters is shared;

a step of selecting any one of the tab images; and a step of allocating, to individual ones of the plurality of operators, the parameters included in the group corresponding to the tab image selected via said step of selecting, so that each one of the parameters allocated to the individual ones of said plurality of operators is adjustable in response to operation of a corresponding one of the operators;

wherein said step of causing indicates that the portion of the parameters is shared between the groups corresponding to two adjoining tab images, by displaying respective portions of the two adjoining tab images, corresponding to the shared portion of the parameters, in at least partly overlapping relation to each other;

wherein the plurality of the parameters correspond to a plurality of frequency bands of an equalizer;

wherein the parameters are grouped in such a manner that, between every two of the groups whose frequency bands adjoin each other, portions of the frequency bands belonging to the adjoining groups overlap each other and within each group, all of the parameters within each group, including parameters that overlap between adjoining groups, are adjustable to set values of the audio mixer; and wherein the plurality of operators and adjustable parameters included in each one of the groups are identical in number to each other.

14. The parameter setting method as recited in claim 13, wherein the plurality of parameters set via the plurality of operators comprise sound volume levels corresponding to individual ones of the plurality of frequency bands of the equalizer.

15. A computer program containing a group of instructions for causing a computer to execute a parameter setting procedure for an audio mixer, the audio mixer including a plurality of operators each operable to set a value of an audio mixer parameter allocated thereto, and a display, said parameter setting procedure comprising:

a step of causing display to display an array of parameter setting images, provided in corresponding relation to a plurality of parameters, to indicate respective settings of the parameters and also display a plurality of tab images for selecting any one of a plurality of groups formed by grouping the plurality of parameters, the plurality of tab images corresponding to the plurality of groups and being displayed in an arrangement associated with the array of the parameter setting images corresponding to the parameters belonging to corresponding ones of the groups, wherein the grouping of the parameters is made in such a manner that a portion of the parameters included in a given one of the groups is shared with another of the groups, and a portion of the tab image corresponding to the portion of the parameters shared with the other group are displayed in a style capable of indicating that the portion of the parameters is shared;

a step of selecting any one of the tab images; and a step of allocating, to individual ones of the plurality of operators, the parameters included in the group corresponding to the tab image selected via said step of selecting, so that each one of the parameters allocated to the individual ones of said plurality of operators is adjustable in response to operation of a corresponding one of the operators;

wherein said step of causing indicates that the portion of the parameters is shared between the groups corresponding to two adjoining tab images, by displaying respective portions of the two adjoining tab images, corresponding to the shared portion of the parameters, in at least partly overlapping relation to each other and within each group, all of the parameters within each group, including parameters that overlap between adjoining groups, are adjustable to set values of the audio mixer;

wherein the plurality of the parameters correspond to a plurality of frequency bands of an equalizer;

wherein the parameters are grouped in such a manner that, between every two of the groups whose frequency bands adjoin each other, portions of the frequency bands belonging to the adjoining groups overlap each other and wherein the plurality of operators and adjustable parameters included in each one of the groups are identical in number to each other.

16. The computer program as recited in claim 15, wherein the plurality of parameters set via the plurality of operators comprise sound volume levels corresponding to individual ones of the plurality of frequency bands of the equalizer.

* * * * *